US012458958B2

(12) United States Patent
Peter et al.

(10) Patent No.: US 12,458,958 B2
(45) Date of Patent: Nov. 4, 2025

(54) COMPOSITION FOR SCR CATALYSTS

(71) Applicants: BASF MOBILE EMISSIONS CATALYSTS LLC, Iselin, NJ (US); HEESUNG CATALYSTS CORPORATION, Seoul (KR)

(72) Inventors: Matthias Peter, Hannover (DE); Claudia Zabel, Hannover (DE); Maria Heenemann, Hannover (DE); Wen-Mei Xue, Iselin, NJ (US); Eunseok Kim, Siheung-si (KR); Narayana K Rao, Sihenug-si (KR); David Pollick, Iselin, NJ (US)

(73) Assignees: BASF Mobile Emissions Catalysts LLC, Iselin, NJ (US); Heesung Catalysts Corporation, Seoul (KR)

( * ) Notice: Subject to any disclaimer, the term of this patent is extended or adjusted under 35 U.S.C. 154(b) by 386 days.

(21) Appl. No.: 17/996,978

(22) PCT Filed: Apr. 27, 2021

(86) PCT No.: PCT/EP2021/060968
§ 371 (c)(1),
(2) Date: Oct. 24, 2022

(87) PCT Pub. No.: WO2021/219628
PCT Pub. Date: Nov. 4, 2021

(65) Prior Publication Data
US 2023/0191376 A1    Jun. 22, 2023

(30) Foreign Application Priority Data

Apr. 28, 2020 (EP) .................................. 20171795

(51) Int. Cl.
*B01J 29/56* (2006.01)
*B01D 53/94* (2006.01)
(Continued)

(52) U.S. Cl.
CPC .............. *B01J 29/56* (2013.01); *B01D 53/94* (2013.01); *B01J 21/04* (2013.01); *B01J 37/0225* (2013.01);
(Continued)

(58) Field of Classification Search
CPC ............... B01D 53/94; B01D 53/9418; B01D 2255/20738; B01D 2255/20761;
(Continued)

(56) References Cited

U.S. PATENT DOCUMENTS 11,192,066 B2 * 12/2021 Trukhan ................... C01B 39/48
11,931,729 B2 *  3/2024 Yang ..................... F01N 3/2803
(Continued)

FOREIGN PATENT DOCUMENTS

| CN | 108993579 A | 12/2018 |
| WO | 2019225909 A | 11/2019 |

OTHER PUBLICATIONS

International Search Report dated Jul. 19, 2021, PCT/EP2021/060968.

*Primary Examiner* — Dapinder Singh
(74) *Attorney, Agent, or Firm* — DLA Piper LLP (US)

(57) ABSTRACT

The present invention relates to a composition comprising a non-zeolitic oxidic material comprising alumina; an 8-membered ring pore zeolitic material comprising one or more of copper and iron, wherein the framework structure of the zeolitic material comprises a tetravalent element Y, a trivalent element X and oxygen, wherein the molar ratio of Y:X, calculated as $YO_2X_2O_3$, is in the range of from 2:1 to 40:1; wherein at least part of the outer surface of the zeolitic material is covered by a layer comprising the non-zeolitic oxidic material; wherein Y comprises one or more of Si, Sn, Ti, Zr and Ge and X comprises one or more of Al, B, In and Ga.

17 Claims, 10 Drawing Sheets

(51) Int. Cl.
*B01J 21/04* (2006.01)
*B01J 35/30* (2024.01)
*B01J 35/77* (2024.01)
*B01J 37/02* (2006.01)
*F01N 3/20* (2006.01)

(52) U.S. Cl.
CPC ............ *F01N 3/2073* (2013.01); *B01J 35/30* (2024.01); *B01J 35/77* (2024.01); *B01J 2235/10* (2024.01); *B01J 2235/30* (2024.01)

(58) Field of Classification Search
CPC ........ B01D 2255/2092; B01D 2255/50; B01D 2258/012; B01J 21/04; B01J 29/56; B01J 29/763; B01J 35/19; B01J 35/30; B01J 35/398; B01J 35/77; B01J 35/0225; B01J 2235/10; B01J 2235/30; F01N 3/2066; F01N 3/2073; F01N 3/28; F01N 3/24; F01N 2610/06; F01N 2370/04; F01N 2370/02; F01N 2370/00; F01N 2510/063; F01N 2570/14; F01N 2570/18; Y02A 50/20; Y02T 10/12

See application file for complete search history.

(56) References Cited

U.S. PATENT DOCUMENTS

| | | |
|---|---|---|
| 2001/0000323 A1* | 4/2001 | Lee ...................... C10G 35/095 423/713 |
| 2013/0101503 A1 | 4/2013 | Yilmaz et al. |
| 2013/0336866 A1 | 12/2013 | Soeger |
| 2015/0104364 A1* | 4/2015 | Elomari .................. C10G 45/54 585/269 |
| 2015/0110712 A1* | 4/2015 | Schmidt .................. C01B 37/02 423/706 |
| 2016/0296920 A1 | 10/2016 | Minami |
| 2017/0050182 A1 | 2/2017 | Gramiccioni |
| 2019/0176087 A1 | 6/2019 | Welsch et al. |
| 2019/0184338 A1 | 6/2019 | Seyler et al. |

\* cited by examiner

Figure 2.1
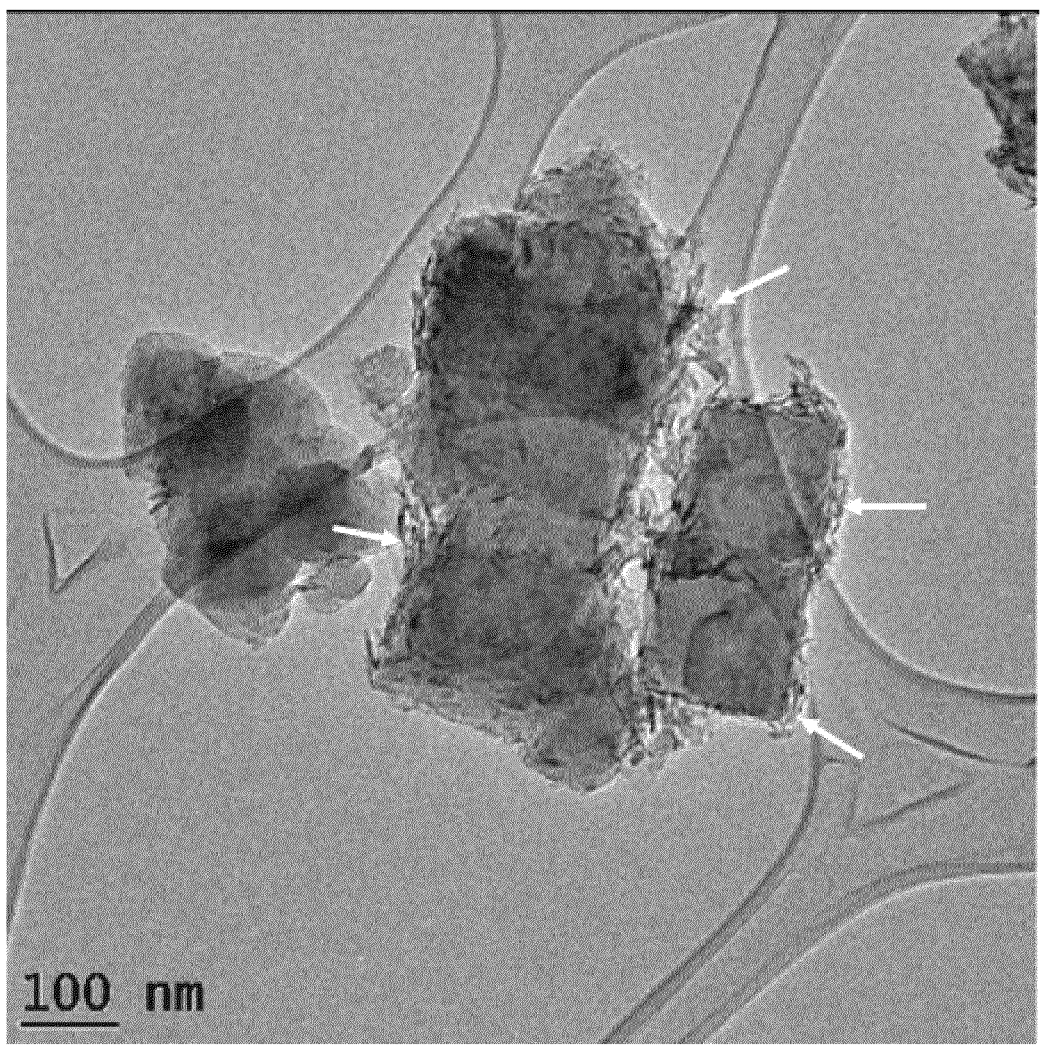

Figure 2.2
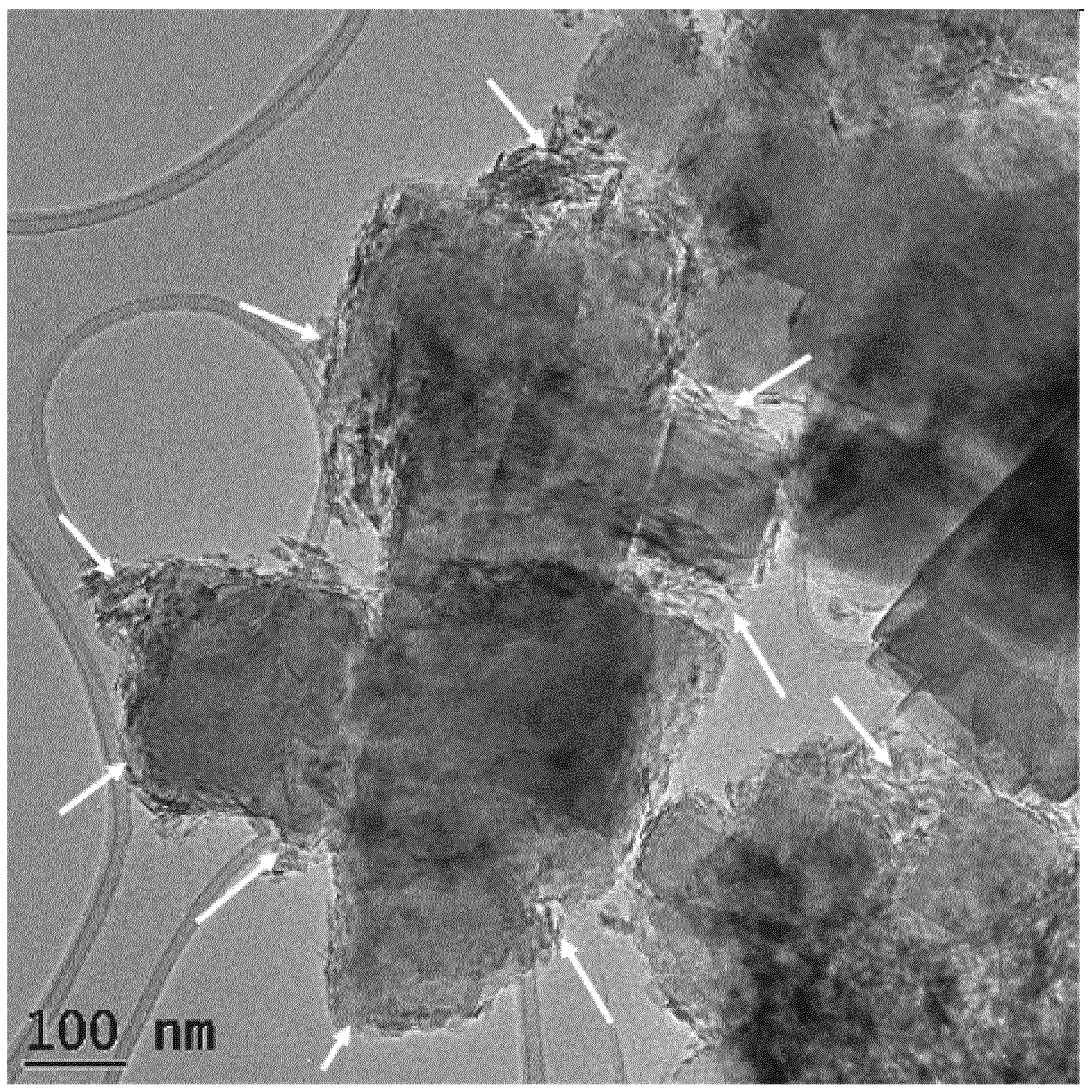

Figure 8.1
(10 % alumina)
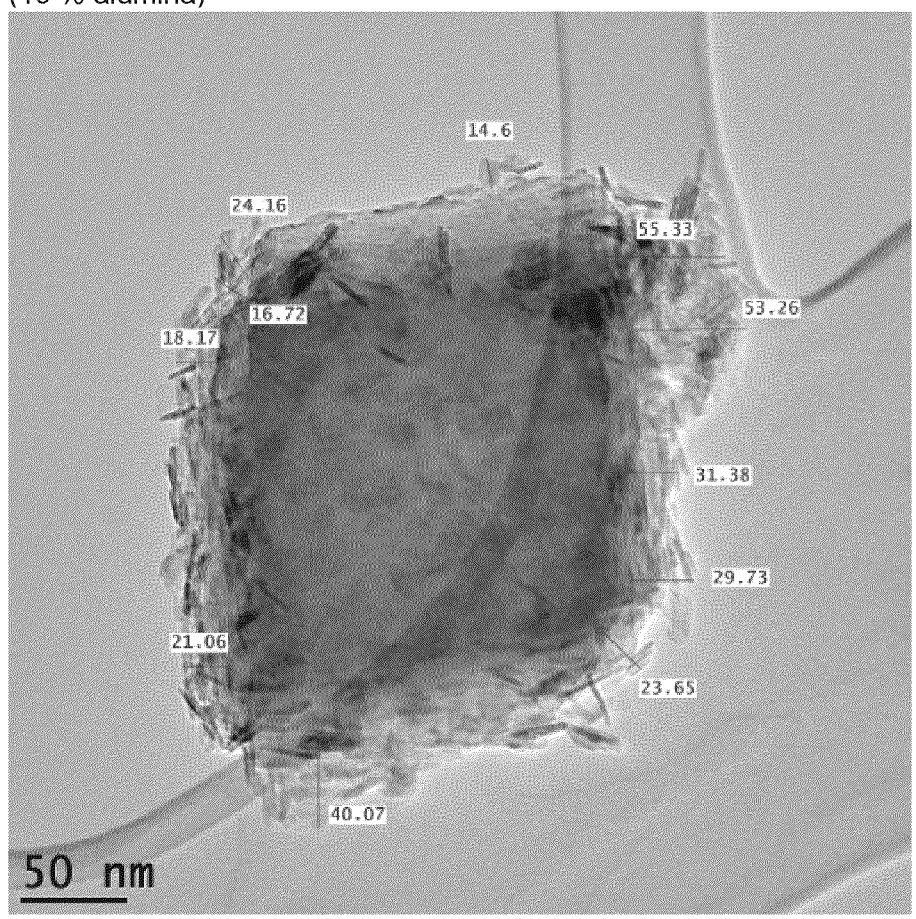

Figure 8.2
(30 % alumina)
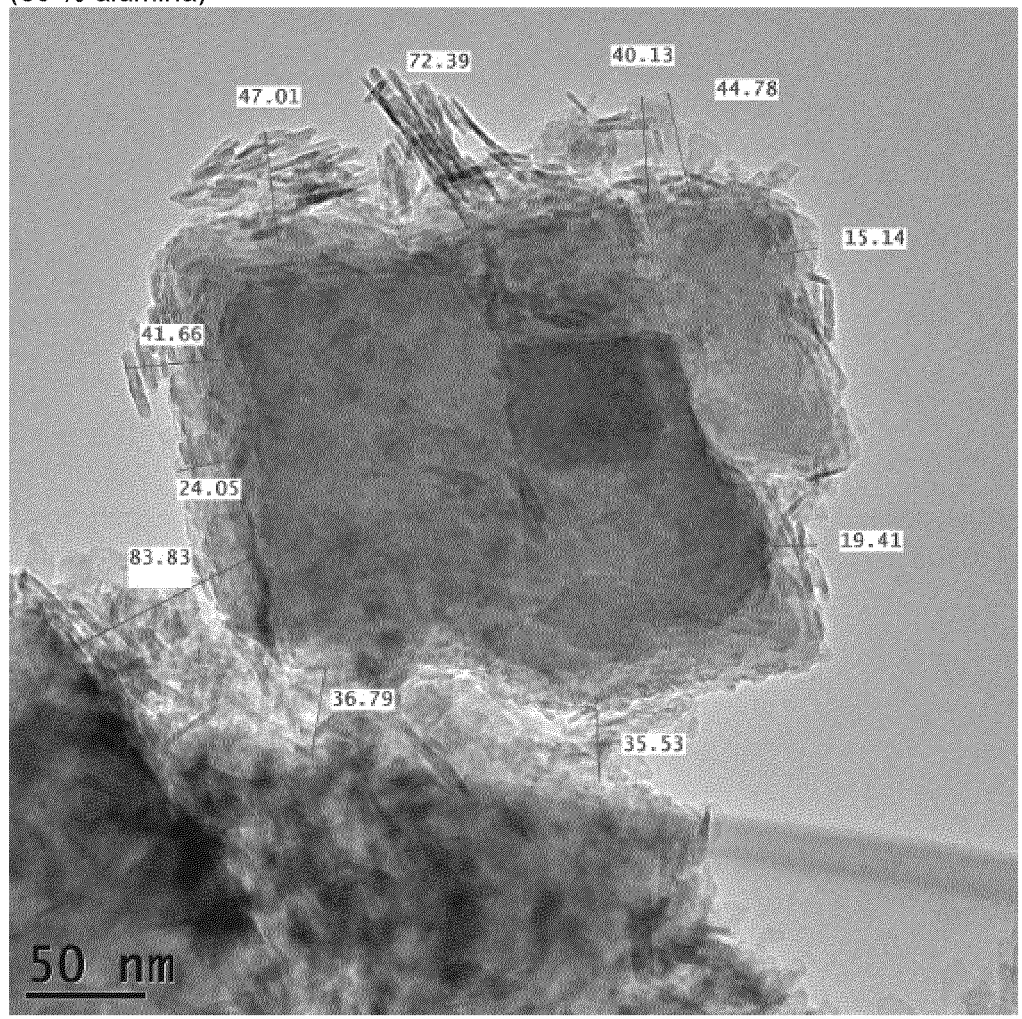

COMPOSITION FOR SCR CATALYSTS

The present invention relates to a composition comprising an 8-membered ring pore zeolitic material comprising one or more of copper and iron, a process for preparing a composition comprising an 8-membered ring pore zeolitic material comprising one or more of copper and iron, a use of said composition and a slurry comprising said composition. Further, the present invention relates to a selective catalytic reduction catalyst for the treatment of an exhaust gas of a combustion engine which comprises said composition, a process for preparing said catalyst and a method for treating exhaust gas using said catalyst.

Core-shell structure for zeolitic materials are discussed in US 2013/0101503 A1 and US 2017/7050182 A1. However, none of these documents discloses selective catalytic reduction technologies and how to improve low and high temperature NOx conversions. CN 108993579 A discloses the use of a Fe-ZSM-5 zeolitic material covered by a shell of mesoporous silica impregnated with cerium to improve selective catalytic reduction (SCR) activity at low temperatures and WO 2019/225909 A discloses a zeolitic material coated with alumina used to improve SCR activity at high temperatures.

However, none of these documents discusses SCR technologies on filter which would permit to obtain a high NOx performance at both low and high temperatures while keeping a low backpressure. Therefore, there is still a need to provide a composition and/or a selective catalytic reduction catalyst which permit(s) to improve the NOx conversion at both low and high temperatures while minimizing the backpressure on filter.

Therefore, the present invention relates to a composition comprising
  (i) a non-zeolitic oxidic material comprising alumina;
  (ii) an 8-membered ring pore zeolitic material comprising one or more of copper and iron, wherein the framework structure of the zeolitic material comprises a tetravalent element Y, a trivalent element X and oxygen, wherein the molar ratio of Y:X, calculated as $YO_2:X_2O_3$, is in the range of from 2:1 to 40:1;
  wherein at least part of the outer surface of the zeolitic material according to (ii) is covered by a layer comprising the non-zeolitic oxidic material according to (i);
  wherein Y comprises one or more of Si, Sn, Ti, Zr and Ge and X comprises one or more of Al, B, In and Ga.

Preferably from 98 to 100 weight-%, more preferably from 99 to 100 weight-%, more preferably from 99.5 to 100 weight-%, more preferably from 99.9 to 100 weight-%, of the non-zeolitic oxidic material according to (i) consist of alumina.

It is preferred that the alumina comprised in the non-zeolitic oxidic material according to (i) is selected from the group consisting of gamma-alumina, alpha-alumina, delta-alumina, theta-alumina and eta-alumina, more preferably of gamma-alumina, alpha-alumina and delta-alumina. It is more preferred that the alumina is gamma-alumina.

It is preferred that the layer comprising the non-zeolitic oxidic material according to (i) has an average thickness in the range of from 2 nm to 100 nm, more preferably in the range of from 5 nm to 70 nm, more preferably in the range of from 20 to 50 nm, more preferably in the range of from 25 nm to 47 nm, more preferably in the range of from 25 to 35 nm, or more preferably in the range of from 40 to 47 nm, the average thickness being determined as in Reference Example 4.

It is preferred that from 40 to 100 weight-%, more preferably from 50 to 100 weight-%, more preferably from 70 to 100 weight-%, of the non-zeolitic oxidic material according to (i) are comprised in the layer.

It is preferred that from 99 to 100 weight-%, more preferably from 99.5 to 100 weight-%, more preferably from 99.9 to 100 weight-%, of the layer consist of the non-zeolitic oxidic material according to (i).

It is preferred that the non-zeolitic oxidic material according to (i) is present in the composition in an amount in the range of from 5 to 50 weight-%, more preferably in the range of from 7 to 40 weight-%, more preferably in the range of from 8 to 32 weight-%, based on the weight of the 8-membered ring pore zeolitic material according to (ii).

As to the 8-membered ring pore zeolitic material according to (ii), it is preferred that it has a framework type selected from the group consisting of CHA, AEI, RTH, LEV, DDR, KFI, ERI, AFX, LTA, a mixture of two or more thereof and a mixed type of two or more thereof, more preferably selected from the group consisting of CHA, AEI, RTH, a mixture of two or more thereof and a mixed type of two or more thereof, more preferably selected from the group consisting of CHA and AEI. It is more preferred that the 8-membered ring pore zeolitic material according to (ii) has a framework type CHA.

It is preferred that the 8-membered ring pore zeolitic material according to (ii) comprises copper, wherein the amount of copper in the zeolitic material, calculated as CuO, more preferably is in the range of from 0.1 to 10 weight-%, more preferably in the range of from 1.5 to 5.5 weight-%, more preferably in the range of from 2.5 to 5.0 weight-%, more preferably in the range of from 3.0 to 4.75 weight-%, more preferably in the range of from 3.25 to 4.5 weight-%, based on the weight of the 8-membered ring pore zeolitic material.

It is more preferred that the amount of iron comprised in the 8-membered ring pore zeolitic material, calculated as $Fe_2O_3$, is in the range of from 0 to 0.01 weight-%, more preferably in the range of from 0 to 0.001 weight-%, more preferably in the range of from 0 to 0.0001 weight-%, based on the weight of the 8-membered ring pore zeolitic material. In other words, it is more preferred that the 8-membered ring pore zeolitic material is substantially free, more preferably free, of iron.

Therefore, the present invention preferably relates to a composition comprising
  (i) a non-zeolitic oxidic material comprising alumina;
  (ii) an 8-membered ring pore zeolitic material, having a framework type CHA, comprising one or more of copper and iron, wherein the framework structure of the zeolitic material comprises a tetravalent element Y, a trivalent element X and oxygen, wherein the molar ratio of Y:X, calculated as $YO_2:X_2O_3$, is in the range of from 2:1 to 40:1;
  wherein at least part of the outer surface of the zeolitic material according to (ii) is covered by a layer comprising the non-zeolitic oxidic material according to (i);
  wherein Y comprises one or more of Si, Sn, Ti, Zr and Ge and X comprises one or more of Al, B, In and Ga;
  wherein the 8-membered ring pore zeolitic material more preferably comprises copper.

In the context of the present invention, it is preferred that from 98 to 100 weight-%, more preferably from 99 to 100 weight-%, more preferably from 99.5 to 100 weight-%, more preferably from 99.9 to 100 weight-% of the framework structure of the 8-membered ring pore zeolitic material according to (ii) consist of X, Y and O.

It is preferred that Y is Si.

It is preferred that X is one or more of Al and B, more preferably Al. It is more preferred that Y is Si and Y is Al.

It is preferred that the molar ratio of Y:X, calculated as $YO_2:X_2O_3$, is in the range of from 5:1 to 30:1, more preferably in the range of from 10:1 to 24:1, more preferably in the range of from 12:1 to 22:1, more preferably in the range of from 15:1 to 20:1, more preferably in the range of from 15:1 to 18:1. In the context of the present invention, it is believed that a composition according to the present invention comprising an 8-membered ring pore zeolitic material having a molar ratio of Y:X, calculated as $YO_2:X_2O_3$, within the aforementioned preferred ranges exhibits improved catalytic activities compared to a composition comprising an 8-membered ring pore zeolitic material having a molar ratio of Y:X, calculated as $YO_2:X_2O_3$, higher than 30:1, preferably higher than 24:1, more preferably higher than 22:1, more preferably higher than 20:1, more preferably higher than 18:1.

It is preferred that from 20 to 100%, more preferably from 30 to 100%, more preferably from 50 to 95%, more preferably from 50 to 60% or more preferably from 80 to 90%, of the outer surface of the zeolitic material according to (ii) are covered by the layer comprising the non-zeolitic oxidic material according to (i). Therefore, the present invention preferably relates to a composition comprising
  (i) a non-zeolitic oxidic material comprising alumina;
  (ii) an 8-membered ring pore zeolitic material comprising one or more of copper and iron,
  wherein the framework structure of the zeolitic material comprises a tetravalent element Y, a trivalent element X and oxygen, wherein the molar ratio of Y:X, calculated as $YO_2:X_2O_3$, is in the range of from 2:1 to 40:1;
  wherein from 20 to 100 weight-%, more preferably from 30 to 100%, more preferably from 50 to 95%, more preferably from 50 to 60% or more preferably from 80 to 90%, of the outer surface of the zeolitic material according to (ii) are covered by a layer comprising the non-zeolitic oxidic material according to (i);
  wherein Y comprises one or more of Si, Sn, Ti, Zr and Ge and X comprises one or more of Al, B, In and Ga. It is more preferred that the present invention relates to a composition comprising
  (i) a non-zeolitic oxidic material comprising alumina;
  (ii) an 8-membered ring pore zeolitic material, having a framework type CHA, comprising one or more of copper and iron, wherein the framework structure of the zeolitic material comprises a tetravalent element Y, a trivalent element X and oxygen, wherein the molar ratio of Y:X, calculated as $YO_2:X_2O_3$, is in the range of from 2:1 to 40:1;
  wherein from 20 to 100 weight-%, more preferably from 30 to 100%, more preferably from 50 to 95%, more preferably from 50 to 60% or more preferably from 80 to 90%, of the outer surface of the zeolitic material according to (ii) are covered by a layer comprising the non-zeolitic oxidic material according to (i);
  wherein Y comprises one or more of Si, Sn, Ti, Zr and Ge and X comprises one or more of Al, B, In and Ga;
  wherein the 8-membered ring pore zeolitic material more preferably comprises copper.

In the context of the present invention, it is preferred that from 0 to 0.00001 weight-%, more preferably from 0 to 0.000001 weight-%, of the composition consist of any platinum group metal. In other words, it is preferred that the composition is substantially free, more preferably free, of any platinum group metal.

It is preferred that from 98 to 100 weight-%, more preferably from 99 to 100 weight-%, more preferably from 99.5 to 100 weight-%, more preferably from 99.9 to 100 weight-%, of the composition consist of the non-zeolitic oxidic material according to (i) and the 8-membered ring pore zeolitic material comprising one or more of copper and iron according to (ii).

It is preferred that at most 0.1 weight-%, more preferably at most 0.01 weight-%, more preferably at most 0.001 weight-%, more preferably at most 0.0001 weight-%, of the one or more of copper and iron comprised in the composition is supported on the non-zeolitic oxidic material according to (i). In other words, it is preferred that substantially none of the one or more of copper and iron, more preferably none of the one or more of copper and iron, is supported on the non-zeolitic oxidic material according to (i).

It is preferred that the composition of the present invention is a calcined composition, more preferably calcined in a gas atmosphere having a temperature in the range of from 400 to 800° C., more preferably in the range of from 450 to 600° C., more preferably in the range of from 450 to 550° C. It is preferred that the gas atmosphere is air.

The present invention further relates to a use of a composition according to the present invention as a catalytic component for the selective catalytic reduction of nitrogen oxide.

The present invention further relates to a slurry comprising a composition according to the present invention and a dispersion agent, wherein the dispersion agent is one or more of water, ethanol, acetic acid, nitric acid, lactic acid, and a mixture of two or more thereof. It is more preferred that the dispersion agent is one or more of water and acetic acid, more preferably water and acetic acid.

The present invention further relates to a process for preparing a composition, preferably a composition according to the present invention, the process comprising:
  (a) providing an 8-membered ring pore zeolitic material, comprising one or more of copper and iron, wherein the zeolitic material preferably comprises crystals having an average crystal size in the range of from 0.05 to 5 micrometers, the average crystal size being determined as in Reference Example 5;
  (b) providing a source of a non-zeolitic oxidic material comprising alumina, wherein the source of the non-zeolitic oxidic material is a colloid dispersion comprising particles of the non-zeolitic oxidic material, wherein the particles of the non-zeolitic oxidic material have a Dv50 in the range of from 30 to 200 nm, the Dv50 being determined as in Reference Example 3;
  (c) admixing the zeolitic material obtained in (a) with the source of the non-zeolitic oxidic material comprising alumina obtained in (b), forming a mixture;
  (d) calcining the mixture obtained in (c) in a gas atmosphere having a temperature in the range of from 400 to 800° C., the gas atmosphere preferably being air.

In the context of the present invention, it is believed that the order of the steps for preparing the aforementioned composition is of high importance. In particular, it is important that the 8-membered ring pore zeolitic material already comprises the one or more of copper and iron, prior to be mixed with the colloid dispersion according to b). Indeed, it is believed that different products would be obtained if the zeolitic material were rather mixed together with the colloid dispersion and the one or more of copper and iron. In particular, the copper and/or iron distribution in the compositions would be different. It is believed that when using the process of the present invention, the one or more of copper and iron is distributed in majority within the zeolitic material, while with a process which mixes the zeolitic material, the colloid dispersion and the one or more of copper and iron all together, the obtained composition will present more copper and/or iron supported on the non-zeolitic oxidic material (such as alumina).

As to (a), it is preferred that it comprises, more preferably consist of,
 (a.1) preparing an aqueous solution of one or more of a copper salt and an iron salt, more preferably of a copper salt, more preferably of copper acetate;
 (a.2) admixing the aqueous solution obtained in (a.1) with an 8-membered ring pore zeolitic material;
 (a.3) calcining the admixture obtained in (a.2).

It is preferred that admixing in (a.2) comprises, more preferably consists of, impregnating the aqueous solution obtained in (a.1) onto the 8-membered ring pore zeolitic material.

It is preferred that calcining in (a.3) is performed in a gas atmosphere having a temperature in the range of from 400 to 800° C., more preferably in the range of from 450 to 600° C., the gas atmosphere more preferably being air.

It is preferred that calcining in (a.3) is performed in a gas atmosphere for a duration in the range of from 0.5 to 4 hours, more preferably in the range of from 1.5 to 3 hours, the gas atmosphere more preferably being air.

It is preferred that the crystals of the 8-membered ring pore zeolitic material have an average crystal size in the range of from 0.06 to 2 micrometers, more preferably in the range of from 0.07 to 1 micrometer, more preferably in the range of from 0.1 to 0.8 micrometer, more preferably in the range of from 0.2 to 0.6 micrometer, the average crystal size being determined as in Reference Example 5.

It is preferred that the 8-membered ring pore zeolitic material comprises particles having a Dv50 in the range of from 0.5 to 4 micrometers, more preferably in the range of from 1 to 3 micrometers, more preferably in the range of from 1.5 to 2.5 micrometers, the Dv50 being determined as in Reference Example 3.

It is preferred that the 8-membered ring pore zeolitic material comprises particles having a Dv90 in the range of from 2 to 15 micrometers, more preferably in the range of from 3 to 10 micrometers, more preferably in the range of from 4 to 8 micrometers, the Dv50 being determined as in Reference Example 3.

It is preferred that the colloid dispersion comprising particles of the non-zeolitic oxidic material provided in (b) is alumina sol.

It is preferred that the particles of the non-zeolitic oxidic material, more preferably the particles of alumina, have a Dv50 in the range of from 50 to 150 nm, more preferably in the range of from 70 to 120 nm, more preferably in the range of from 80 to 110 nm, more preferably in the range of from 80 to 90 nm, the Dv50 being determined as in Reference Example 3. In the context of the present invention, it is believed that should the Dv50 be higher than the aforementioned upper limits, no core-shell structure will be obtained around the 8-membered ring pore zeolitic material comprising one or more of copper and iron.

In the context of the present invention, it is noted that the 8-membered ring pore zeolitic material is preferably defined as in the foregoing when describing the composition of the present invention.

In the context of the present invention, it is noted that the non-zeolitic oxidic material is preferably the non-zeolitic oxidic material defined in the foregoing when describing the composition of the present invention.

In the context of the present invention, it is preferred that (c) comprises, more preferably consists of,
 (c.1) preparing a mixture of water and the source of the non-zeolitic oxidic material comprising alumina, more preferably alumina sol, obtained in (b);
 (c.2) admixing the zeolitic material obtained in (a) with the mixture obtained in (c.1).

It is preferred that calcining according to (d) is performed in a gas atmosphere having a temperature in the range of from 450 to 600° C., more preferably in the range of from 450 to 550° C., the gas atmosphere more preferably being air.

It is preferred that calcining according to (d) is performed in a gas atmosphere for a duration in the range of from 0.5 to 4 hours, more preferably in the range of from 1 to 3 hours, more preferably in the range of from 1.5 to 2.5 hours, the gas atmosphere more preferably being air.

It is preferred that the process consists of (a), (b), (c) and (d).

The present invention further relates to a composition, preferably a composition according to the present invention, obtained or obtainable by a process according to the present invention.

The present invention further relates to a selective catalytic reduction catalyst for the treatment of an exhaust gas of a combustion engine, the catalyst comprising:
 (1) a substrate comprising an inlet end, an outlet end, a substrate axial length extending from the inlet end to the outlet end and a plurality of passages defined by internal walls of the substrate extending therethrough;
 (2) a coating disposed on the substrate (i), the coating comprising a composition according to the present invention.

It is preferred that the coating (2) further comprises an oxidic binder, wherein the oxidic binder more preferably comprises one or more of zirconia, alumina, titania, silica, and a mixed oxide comprising two or more of Zr, Al, Ti, and Si, more preferably comprises one or more of silica, alumina and zirconia. It is more preferred that the oxidic binder comprises, more preferably is, one or more of alumina and zirconia, more preferably zirconia.

It is preferred that the oxidic binder, more preferably zirconia, is comprised in the coating (2) in an amount, calculated as the oxide, more preferably calculated as $ZrO_2$, in the range of from 0.1 to 10 weight-%, more preferably in the range of from 1 to 7 weight-%, more preferably in the range of from 2 to 6.5 weight-%, more preferably in the range of from 3 to 6 weight-%, more preferably in the range of from 4 to 5.5 weight-%, based on the weight of the 8-membered ring pore zeolitic material.

It is preferred that the coating (2) comprises the composition in an amount in the range of from 80 to 100 weight-%, more preferably in the range of from 90 to 99 weight-%, more preferably in the range of from 92 to 98 weight-%, more preferably in the range of from 94 to 97 weight-%, based on the weight of the coating (2).

It is preferred that the loading of the coating (2) is in the range of from 1 to 3.5 g/in$^3$, more preferably in the range of from 1.5 to 3 g/in$^3$, more preferably in the range of from 1.75 to 2.5 g/in$^3$.

It is preferred that the coating (2) extends over x % of the substrate axial length, more preferably from the inlet end to the outlet end of the substrate, wherein x is in the range of from 80 to 100, more preferably in the range of from 90 to 100, more preferably in the range of from 95 to 100, more preferably in the range of from 98 to 100.

It is preferred that from 98 to 100 weight-%, more preferably from 99 to 100 weight-%, more preferably from 99.5 to 100 weight-%, more preferably from 99.9 to 100 weight-%, of the coating (2) consist of the composition according to the present invention and more preferably an oxidic binder as defined in the foregoing.

It is preferred that from 0 to 0.00001 weight-%, more preferably from 0 to 0.000001 weight-%, of the coating (2) consist of any platinum group metal. In other words, it is preferred that the coating (2) is substantially free, more preferably free, of any platinum group metal.

It is preferred that the substrate is a wall-flow filter substrate or a flow-through substrate, more preferably a wall-flow filter substrate, wherein the plurality of passages more preferably comprises inlet passages having an open inlet end and a closed outlet end, and outlet passages having a closed inlet end and an open outlet end.

It is preferred that the wall-flow filter substrate is a porous wall-flow filter substrate, wherein the wall-flow filter substrate more preferably is one or more of a cordierite wall-flow filter substrate, a silicon carbide wall-flow filter substrate and an aluminum titanate wall-flow filter substrate, more preferably one or more of a silicon carbide wall-flow filter substrate and an aluminum titanate wall-flow filter substrate, more preferably a silicon carbide wall-flow filter substrate.

It is preferred that the coating is within the internal walls of the wall-flow filter substrate and/or on the surface of the internal walls of the wall-flow filter substrate.

It is preferred that at least 95 weight-%, more preferably from 95 to 100 weight-%, more preferably from 97 to 99.9 weight-%, more preferably from 98 to 99.5 weight-%, of the coating is within the internal walls of the wall-flow filter substrate. The amount of coating within the internal walls of a substrate is quantified with electron microscopy, preferably scanning electron microscopy (SEM).

It is preferred that at most 5 weight-%, more preferably from 0 to 5 weight-%, more preferably from 0.1 to 3 weight-%, more preferably from 0.5 to 2 weight-%, of the coating is within the internal walls of the wall-flow filter substrate. The amount of coating on the surface of the internal walls of a substrate is quantified with electron microscopy, preferably scanning electron microscopy (SEM).

It is preferred that the coating is within the internal walls of the wall-flow filter substrate and on the surface of the internal walls of the wall-flow filter substrate.

It is preferred that the selective catalytic reduction catalyst of the present invention consists of the substrate (1) and the coating (2).

The present invention further relates to a process for preparing the selective catalytic reduction catalyst for the treatment of an exhaust gas of a combustion engine according to the present invention, the process comprising (A) preparing a mixture comprising water and a composition according to the present invention, preferably prepared according to a process according to the present invention;

(B) disposing the mixture obtained according to (A) on a substrate, the substrate comprising an inlet end, an outlet end, a substrate axial length extending from the inlet end to the outlet end and a plurality of passages defined by internal walls of the substrate extending therethrough, obtaining a mixture-treated substrate;

(C) calcining the mixture-treated substrate obtained according to (B), obtaining the substrate having a coating disposed thereon.

As to (A), it is preferred that it comprises, (A.1) preparing a first mixture comprising water and a composition according to the present invention, more preferably prepared according to a process according to the present invention;

(A.2) adding a source of an oxidic binder, more preferably a zirconium salt, more preferably zirconium acetate, to the first mixture obtained in (A.1), obtaining a second mixture;

(A.3) more preferably adding an organic acid to the second mixture obtained in (A.2), obtaining a third mixture.

(A.4) more preferably milling the second mixture obtained in (A.2), more preferably the third mixture obtained in (A.3), more preferably until the particles of said mixture have a Dv90 in the range of from 1 to 10 micrometers, more preferably in the range of from 2 to 7 micrometers, more preferably in the range of from 3 to 5 micrometers, the Dv90 being determined as described in Reference Example 3;

wherein (A) more preferably comprises (A.1), (A.2) and (A.4), more preferably wherein (A) comprises, more preferably consists of, (A.1), (A.2), (A.3) and (A.4).

It is preferred that the organic acid added according to (A.3) is one or more of acetic acid, tartaric acid, citric acid, nitric acid, lactic acid, hydrochloric acid and a sulfuric acid, wherein the organic acid more preferably is acetic acid.

It is preferred that disposing the mixture obtained according to (A) on the substrate according to (B) is performed by dipping the substrate in the mixture obtained according to (A). Thus, the mixture prepared according to (A) preferably permeates/penetrates the internal walls of the substrate and preferably is on the surface of the internal walls of the substrate.

It is preferred according to (B) that the mixture prepared according to (A) is disposed on the substrate over x % of the substrate axial length, wherein x is in the range of from 80 to 100, more preferably in the range of from 90 to 100, more preferably in the range of from 95 to 100, more preferably in the range of from 98 to 100. Thus, the mixture prepared according to (A) preferably permeates/penetrates the internal walls of the substrate and preferably is on the surface of the internal walls of the substrate.

It is preferred that the mixture prepared according to (A) is disposed on the substrate from the inlet end to the outlet end of the substrate.

As to (B), it is preferred that it comprises (B.1) disposing a first portion of the mixture obtained in (A) on a substrate comprising an inlet end, an outlet end, a substrate axial length extending from the inlet end to the outlet end and a plurality of passages defined by internal walls of the substrate extending therethrough, the disposing more preferably being from the inlet end toward the outlet end of the substrate; and drying the substrate comprising the first portion of the mixture disposed thereon;

(B.2) disposing a second portion of the mixture obtained in (A) on the substrate comprising the first portion of the mixture obtained in (B.1), the disposing more preferably being from the inlet end toward the outlet end of the substrate; and more preferably drying the substrate comprising the first and the second portion of the mixture disposed thereon.

Thus, the mixture prepared according to (A) preferably permeates/penetrates the internal walls of the substrate and preferably is on the surface of the internal walls of the substrate.

It is more preferred that (B) comprises
 (B.1) disposing a first portion of the mixture obtained in (A) on a substrate comprising an inlet end, an outlet end, a substrate axial length extending from the inlet end to the outlet end and a plurality of passages defined by internal walls of the substrate extending therethrough, the disposing being from the inlet end toward the outlet end of the substrate, more preferably over x % of the substrate axial length, wherein x is as defined in the foregoing; and drying the substrate comprising the first portion of the mixture disposed thereon;
 (B.2) disposing a second portion of the mixture obtained in (A) on the substrate comprising the first portion of the mixture obtained in (B.1), the disposing being from the inlet end toward the outlet end of the substrate, more preferably over x % of the substrate axial length, wherein x is as defined in the foregoing; and more preferably drying the substrate comprising the first and the second portion of the mixture disposed thereon.

As an alternative, it is more preferred that (B) comprises
 (B'.1) disposing a first portion of the mixture obtained in (A) on a substrate comprising an inlet end, an outlet end, a substrate axial length extending from the inlet end to the outlet end and a plurality of passages defined by internal walls of the substrate extending therethrough, the disposing being from the inlet end toward the outlet end of the substrate, more preferably over Xa % of the substrate axial length, wherein Xa is in the range of from 40 to 80, more preferably in the range of from 50 to 70; and drying the substrate comprising the first portion of the mixture disposed thereon;
 (B'.2) disposing a second portion of the mixture obtained in (A) on the substrate comprising the first portion of the mixture obtained in (B'.1), the disposing being from the outlet end toward the inlet end of the substrate, more preferably over Xb % of the substrate axial length, wherein Xb is in the range of from 40 to 80, more preferably in the range of from 50 to 70; and more preferably drying the substrate comprising the first and the second portion of the mixture disposed thereon.

In the context of the present invention, it is preferred that calcining according to (C) is performed in a gas atmosphere having a temperature in the range of from 300 to 800° C., more preferably in the range of from 350 to 700° C., the gas atmosphere more preferably being air.

It is preferred that calcining according to (C) is performed in a gas atmosphere for a duration in the range of from 0.2 to 4 hours, preferably in the range of from 0.5 to 3 hours, the gas atmosphere more preferably being air.

Prior to calcining according to (C), it is preferred that drying is performed in a gas atmosphere having a temperature in the range of from 90 to 150° C., more preferably in the range of from 100 to 140° C., the gas atmosphere more preferably being air. Thus, calcining according to (C) is preferably performed on a dried mixture-treated substrate.

Prior to calcining according to (C), it is preferred that drying is performed in a gas atmosphere for a duration in the range of from 5 to 150 minutes, more preferably in the range of from 10 to 120 minutes, the gas atmosphere more preferably being air.

It is preferred that the process of the present invention for preparing the selective catalytic reduction catalyst for the treatment of an exhaust gas of a combustion engine according to the present invention consists of (A), (B) and (C).

The present invention further relates to a selective catalytic reduction catalyst for the treatment of an exhaust gas of a combustion engine, preferably a selective catalytic reduction catalyst for the treatment of an exhaust gas of a combustion engine according to the present invention, obtainable or obtained by a process according to the present invention.

The present invention further relates to a method for the selective catalytic reduction of nitrogen oxide, the method comprising
 (I) providing the exhaust gas stream, preferably from a combustion engine, preferably a diesel engine;
 (II) passing the exhaust gas stream provided in (I) through a selective catalytic reduction catalyst according to the present invention.

The present invention is further illustrated by the following set of embodiments and combinations of embodiments resulting from the dependencies and back-references as indicated. In particular, it is noted that in each instance where a range of embodiments is mentioned, for example in the context of a term such as "The composition of any one of embodiments 1 to 4", every embodiment in this range is meant to be explicitly disclosed for the skilled person, i.e. the wording of this term is to be understood by the skilled person as being synonymous to "The composition of any one of embodiments 1, 2, 3, and 4". Further, it is explicitly noted that the following set of embodiments is not the set of claims determining the extent of protection, but represents a suitably structured part of the description directed to general and preferred aspects of the present invention.

1. A composition comprising
 (i) a non-zeolitic oxidic material comprising alumina;
 (ii) an 8-membered ring pore zeolitic material comprising one or more of copper and iron, wherein the framework structure of the zeolitic material comprises a tetravalent element Y, a trivalent element X and oxygen, wherein the molar ratio of Y:X, calculated as $YO_2:X_2O_3$, is in the range of from 2:1 to 40:1;
 wherein at least part of the outer surface of the zeolitic material according to (ii) is covered by a layer comprising the non-zeolitic oxidic material according to (i);
 wherein Y comprises one or more of Si, Sn, Ti, Zr and Ge and X comprises one or more of Al, B, In and Ga.

2. The composition of embodiment 1, wherein from 98 to 100 weight-%, preferably from 99 to 100 weight-%, more preferably from 99.5 to 100 weight-%, more preferably from 99.9 to 100 weight-%, of the non-zeolitic oxidic material according to (i) consist of alumina.

3. The composition of embodiment 1 or 2, wherein the alumina comprised in the non-zeolitic oxidic material according to (i) is selected from the group consisting of gamma-alumina, alpha-alumina, delta-alumina, theta-alumina and eta-alumina, preferably of gamma-alumina, alpha-alumina and delta-alumina, more preferably wherein the alumina is gamma-alumina.

4. The composition of any one of embodiments 1 to 3, wherein the layer comprising the non-zeolitic oxidic material according to (i) has an average thickness in the range of from 2 nm to 100 nm, preferably in the range of from 5 nm to 70 nm, more preferably in the range of from 20 to 50 nm, more preferably in the range of from 25 nm to 47 nm, more preferably in the range of from 25 to 35 nm, or more preferably in the range of from 40 to 47 nm, the average thickness being determined as in Reference Example 4.

5. The composition of any one of embodiments 1 to 4, wherein from 40 to 100 weight-%, preferably from 50 to 100 weight-%, more preferably from 70 to 100 weight-%, of the non-zeolitic oxidic material according to (i) are comprised in the layer.

6. The composition of any one of embodiments 1 to 5, wherein from 99 to 100 weight-%, preferably from 99.5 to 100 weight-%, more preferably from 99.9 to 100 weight-%, of the layer consist of the non-zeolitic oxidic material according to (i).

7. The composition of any one of embodiments 1 to 6, wherein the non-zeolitic oxidic material according to (i) is present in the composition in an amount in the range of from 5 to 50 weight-%, preferably in the range of from 7 to 40 weight-%, more preferably in the range of from 8 to 32 weight-%, based on the weight of the 8-membered ring pore zeolitic material according to (ii).

8. The composition of any one of embodiments 1 to 7, wherein the 8-membered ring pore zeolitic material according to (ii) has a framework type selected from the group consisting of CHA, AEI, RTH, LEV, DDR, KFI, ERI, AFX, LTA, a mixture of two or more thereof and a mixed type of two or more thereof, preferably selected from the group consisting of CHA, AEI, RTH, a mixture of two or more thereof and a mixed type of two or more thereof, more preferably selected from the group consisting of CHA and AEI, wherein more preferably the 8-membered ring pore zeolitic material according to (ii) has a framework type CHA.

9. The composition of any one of embodiments 1 to 8, wherein the 8-membered ring pore zeolitic material according to (ii) comprises copper, wherein the amount of copper in the zeolitic material, calculated as CuO, preferably is in the range of from 0.1 to 10 weight-%, more preferably in the range of from 1.5 to 5.5 weight-%, more preferably in the range of from 2.5 to 5.0 weight-%, more preferably in the range of from 3.0 to 4.75 weight-%, more preferably in the range of from 3.25 to 4.5 weight-%, based on the weight of the 8-membered ring pore zeolitic material.

10. The composition of embodiment 9, wherein the amount of iron comprised in the 8-membered ring pore zeolitic material, calculated as $Fe_2O_3$, is in the range of from 0 to 0.01 weight-%, preferably in the range of from 0 to 0.001 weight-%, more preferably in the range of from 0 to 0.0001 weight-%, based on the weight of the 8-membered ring pore zeolitic material.

11. The composition of any one of embodiments 1 to 10, wherein from 98 to 100 weight-%, preferably from 99 to 100 weight-%, more preferably from 99.5 to 100 weight-%, more preferably from 99.9 to 100 weight-% of the framework structure of the 8-membered ring pore zeolitic material according to (ii) consist of X, Y and O.

12. The composition of any one of embodiments 1 to 11, wherein Y is Si.

13. The composition of any one of embodiments 1 to 12, wherein X is one or more of Al and B, preferably Al.

14. The composition of any one of embodiments 1 to 13, wherein the molar ratio of Y:X, calculated as $YO_2:X_2O_3$, is in the range of from 5:1 to 30:1, preferably in the range of from 10:1 to 24:1, more preferably in the range of from 12:1 to 22:1, more preferably in the range of from 15:1 to 20:1, more preferably in the range of from 15:1 to 18:1.

15. The composition of any one of embodiments 1 to 14, wherein from 20 to 100%, preferably from 30 to 100%, more preferably from 50 to 95%, more preferably from 50 to 60% or more preferably from 80 to 90%, of the outer surface of the zeolitic material according to (ii) are covered by the layer comprising the non-zeolitic oxidic material according to (i).

16. The composition of any one of embodiments 1 to 15, wherein from 0 to 0.00001 weight-%, preferably from 0 to 0.000001 weight-%, of the composition consist of any platinum group metal.

17. The composition of any one of embodiments 1 to 16, wherein from 98 to 100 weight-%, preferably from 99 to 100 weight-%, more preferably from 99.5 to 100 weight-%, more preferably from 99.9 to 100 weight-%, of the composition consist of the non-zeolitic oxidic material according to (i) and the 8-membered ring pore zeolitic material comprising one or more of copper and iron according to (ii).

18. The composition of any one of embodiments 1 to 17, being a calcined composition, preferably calcined in a gas atmosphere having a temperature in the range of from 400 to 800° C., preferably in the range of from 450 to 600° C., more preferably in the range of from 450 to 550° C., the gas atmosphere preferably being air.

19. Use of a composition according to any one of embodiments 1 to 18 as a catalytic component for the selective catalytic reduction of nitrogen oxide.

20. A slurry comprising a composition according to any one of embodiments 1 to 18 and a dispersion agent, wherein the dispersion agent is one or more of water, ethanol, acetic acid, nitric acid, lactic acid, and a mixture of two or more thereof, preferably wherein the dispersion agent is one or more of water and acetic acid, more preferably water and acetic acid.

21. A process for preparing a composition, preferably a composition according to any one of embodiments 1 to 18, the process comprising:
   (a) providing an 8-membered ring pore zeolitic material, comprising one or more of copper and iron, wherein the framework structure of the zeolitic material comprises a tetravalent element Y, a trivalent element X and oxygen, wherein the molar ratio of Y:X, calculated as $YO_2:X_2O_3$, is in the range of from 2:1 to 40:1, wherein the zeolitic material preferably comprises crystals having an average crystal size in the range of from 0.05 to 5 micrometers, the average crystal size being determined as in Reference Example 5;
   (b) providing a source of a non-zeolitic oxidic material comprising alumina, wherein the source of the non-zeolitic oxidic material is a colloid dispersion comprising particles of the non-zeolitic oxidic material, wherein the particles of the non-zeolitic oxidic material have a Dv50 in the range of from 30 to 200 nm, the Dv50 being determined as in Reference Example 3;
   (c) admixing the zeolitic material obtained in (a) with the source of the non-zeolitic oxidic material comprising alumina obtained in (b), forming a mixture;
   (d) calcining the mixture obtained in (c) in a gas atmosphere having a temperature in the range of from 400 to 800° C., the gas atmosphere preferably being air.

22. The process of embodiment 21, wherein (a) comprises, preferably consist of,
   (a.1) preparing an aqueous solution of one or more of a copper salt and an iron salt, preferably of a copper salt, more preferably of copper acetate;
   (a.2) admixing the aqueous solution obtained in (a.1) with an 8-membered ring pore zeolitic material;
   (a.3) calcining the admixture obtained in (a.2).

23. The process of embodiment 22, wherein admixing in (a.2) comprises, preferably consists of, impregnating the aqueous solution obtained in (a.1) onto the 8-membered ring pore zeolitic material.

24. The process of embodiment 22 or 23, wherein calcining in (a.3) is performed in a gas atmosphere having a temperature in the range of from 400 to 800° C., preferably in the range of from 450 to 600° C., the gas atmosphere preferably being air.
25. The process of any one of embodiments 22 to 24, wherein calcining in (a.3) is performed for a duration in the range of from 0.5 to 4 hours, preferably in the range of from 1.5 to 3 hours.
26. The process of any one of embodiments 21 to 25, wherein the crystals of the 8-membered ring pore zeolitic material have an average crystal size in the range of from 0.06 to 2 micrometers, preferably in the range of from 0.07 to 1 micrometer, more preferably in the range of from 0.1 to 0.8 micrometer, more preferably in the range of from 0.2 to 0.6 micrometer, the average crystal size being determined as in Reference Example 5.
27. The process of any one of embodiments 21 to 26, wherein the 8-membered ring pore zeolitic material comprises particles having a Dv50 in the range of from 0.5 to 4 micrometers, preferably in the range of from 1 to 3 micrometers, more preferably in the range of from 1.5 to 2.5 micrometers, the Dv50 being determined as in Reference Example 3.
28. The process of any one of embodiments 21 to 27, wherein the 8-membered ring pore zeolitic material comprises particles having a Dv90 in the range of from 2 to 15 micrometers, preferably in the range of from 3 to 10 micrometers, more preferably in the range of from 4 to 8 micrometers, the Dv50 being determined as in Reference Example 3.
29. The process of any one of embodiments 21 to 28, wherein the colloid dispersion comprising particles of the non-zeolitic oxidic material provided in (b) is alumina sol.
30. The process of any one of embodiments 21 to 29, wherein the particles of the non-zeolitic oxidic material, preferably the particles of alumina, have a Dv50 in the range of from 50 to 150 nm, preferably in the range of from 70 to 120 nm, more preferably in the range of from 80 to 110 nm, more preferably in the range of from 80 to 90 nm, the Dv50 being determined as in Reference Example 3.
31. The process of any one of embodiments 21 to 30, wherein (c) comprises, preferably consists of,
    (c.1) preparing a mixture of water and the source of the non-zeolitic oxidic material comprising alumina, preferably alumina sol, obtained in (b);
    (c.2) admixing the zeolitic material obtained in (a) with the mixture obtained in (c.1).
32. The process of any one of embodiments 21 to 31, wherein calcining according to (d) is performed in a gas atmosphere having a temperature in the range of from 450 to 600° C., preferably in the range of from 450 to 550° C., the gas atmosphere preferably being air.
33. The process of any one of embodiments 21 to 32, wherein calcining according to (d) is performed in a gas atmosphere for a duration in the range of from 0.5 to 4 hours, preferably in the range of from 1 to 3 hours, more preferably in the range of from 1.5 to 2.5 hours, the gas atmosphere preferably being air.
34. The process of any one of embodiments 21 to 33, consisting of (a), (b), (c) and (d).
35. A composition, preferably a composition according to any one of embodiments 1 to 18, obtained or obtainable by a process according to any one of embodiments 21 to 34.
36. A selective catalytic reduction catalyst for the treatment of an exhaust gas of a combustion engine, the catalyst comprising:
    (1) a substrate comprising an inlet end, an outlet end, a substrate axial length extending from the inlet end to the outlet end and a plurality of passages defined by internal walls of the substrate extending therethrough;
    (2) a coating disposed on the substrate (i), the coating comprising a composition according to any one of embodiments 1 to 18 and 35.
37. The catalyst of embodiment 36, wherein the coating (2) further comprises an oxidic binder, wherein the oxidic binder preferably comprises one or more of zirconia, alumina, titania, silica, and a mixed oxide comprising two or more of Zr, Al, Ti, and Si, more preferably comprises one or more of silica, alumina and zirconia, more preferably comprises one or more of alumina and zirconia, more preferably zirconia.
38. The catalyst of embodiment 37, wherein the oxidic binder, preferably zirconia, is comprised in the coating (2) in an amount, calculated as the oxide, preferably calculated as $ZrO_2$, in the range of from 0.1 to 10 weight-%, preferably in the range of from 1 to 7 weight-%, more preferably in the range of from 2 to 6.5 weight-%, more preferably in the range of from 3 to 6 weight-%, more preferably in the range of from 4 to 5.5 weight-%, based on the weight of the 8-membered ring pore zeolitic material.
39. The catalyst of any one of embodiments 36 to 38, wherein the coating (2) comprises the composition in an amount in the range of from 80 to 100 weight-%, preferably in the range of from 90 to 99 weight-%, more preferably in the range of from 92 to 98 weight-%, more preferably in the range of from 94 to 97 weight-%, based on the weight of the coating (2).
40. The catalyst of any one of embodiments 36 to 39, wherein the loading of the coating (2) is in the range of from 1 to 3.5 $g/in^3$, preferably in the range of from 1.5 to 3 $g/in^3$, more preferably in the range of from 1.75 to 2.5 $g/in^3$.
41. The catalyst of any one of embodiments 36 to 40, wherein the coating (2) extends over x % of the substrate axial length, preferably from the inlet end to the outlet end of the substrate, wherein x is in the range of from 80 to 100, preferably in the range of from 90 to 100, more preferably in the range of from 95 to 100, more preferably in the range of from 98 to 100.
42. The catalyst of any one of embodiments 36 to 41, wherein from 98 to 100 weight-%, preferably from 99 to 100 weight-%, more preferably from 99.5 to 100 weight-%, more preferably from 99.9 to 100 weight-%, of the coating (2) consist of the composition according to any one of embodiments 1 to 18 and 35 and preferably an oxidic binder as defined in embodiment 37 or 38.
43. The catalyst of any one of embodiments 36 to 42, wherein the substrate is a wall-flow filter substrate or a flow-through substrate, preferably a wall-flow filter substrate, wherein the plurality of passages preferably comprise inlet passages having an open inlet end and a closed outlet end, and outlet passages having a closed inlet end and an open outlet end.
44. The catalyst of embodiment 43, wherein the wall-flow filter substrate is a porous wall-flow filter substrate, wherein the wall-flow filter substrate preferably is one or more of a cordierite wall-flow filter substrate, a silicon carbide wall-flow filter substrate and an aluminum titanate wall-flow filter substrate, more preferably one or more of a silicon carbide wall-flow filter substrate and an aluminum titanate wall-flow filter substrate, more preferably a silicon carbide wall-flow filter substrate.

45. The catalyst of embodiment 43 or 44, wherein the coating is on the surface of the internal walls of the wall-flow filter substrate and/or within the internal walls of the wall-flow filter substrate, preferably the coating is on the surface of the internal walls of the wall-flow filter substrate and within the internal walls of the wall-flow filter substrate.

46. The catalyst of any one of embodiments 36 to 45, consisting of the substrate (1) and the coating (2).

47. A process for preparing the selective catalytic reduction catalyst for the treatment of an exhaust gas of a combustion engine according to any one of embodiments 36 to 46, the process comprising
   (A) preparing a mixture comprising water and a composition according to any one of embodiments 1 to 18 and 35, preferably prepared according to a process according to any one of embodiments 21 to 34;
   (B) disposing the mixture obtained according to (A) on a substrate, the substrate comprising an inlet end, an outlet end, a substrate axial length extending from the inlet end to the outlet end and a plurality of passages defined by internal walls of the substrate extending therethrough, obtaining a mixture-treated substrate;
   (C) calcining the mixture-treated substrate obtained according to (B), obtaining the substrate having a coating disposed thereon.

48. The process of embodiment 47, wherein (A) comprises,
   (A.1) preparing a first mixture comprising water and a composition according to any one of embodiments 1 to 18 and 35, preferably prepared according to a process according to any one of embodiments 21 to 34;
   (A.2) adding a source of an oxidic binder, preferably a zirconium salt, more preferably zir*conium* acetate, to the first mixture obtained in (A.1), obtaining a second mixture;
   (A.3) preferably adding an organic acid to the second mixture obtained in (A.2), obtaining a third mixture.
   (A.4) preferably milling the second mixture obtained in (A.2), more preferably the third mixture obtained in (A.3), more preferably until the particles of said mixture have a Dv90 in the range of from 1 to 10 micrometers, more preferably in the range of from 2 to 7 micrometers, more preferably in the range of from 3 to 5 micrometers, the Dv90 being determined as described in Reference Example 3;
   wherein (A) preferably comprises (A.1), (A.2) and (A.4), more preferably wherein (A) comprises, more preferably consists of, (A.1), (A.2), (A.3) and (A.4).

49. The process of embodiment 48, wherein the organic acid added according to (A.3) is one or more of acetic acid, tartaric acid, citric acid, nitric acid, lactic acid, hydrochloric acid and a sulfuric acid, wherein the organic acid preferably is acetic acid.

50. The process of any one of embodiments 47 to 49, wherein disposing the mixture obtained according to (A) on the substrate according to (B) is performed by dipping the substrate in the mixture obtained according to (A).

51. The process of any one of embodiments 47 to 50, wherein according to (B), the mixture prepared according to (A) is disposed on the surface of the internal walls of the substrate over x % of the substrate axial length, wherein x is in the range of from 80 to 100, preferably in the range of from 90 to 100, more preferably in the range of from 95 to 100, more preferably in the range of from 98 to 100.

52. The process of any one of embodiments 47 to 51, wherein the mixture prepared according to (A) is disposed on the surface of the internal walls of the substrate from the inlet end to the outlet end of the substrate.

53. The process of any one of embodiments 47 to 52, wherein (B) comprises
   (B.1) disposing a first portion of the mixture obtained in (A) on a substrate comprising an inlet end, an outlet end, a substrate axial length extending from the inlet end to the outlet end and a plurality of passages defined by internal walls of the substrate extending therethrough, the disposing preferably being from the inlet end toward the outlet end of the substrate; and drying the substrate comprising the first portion of the mixture disposed thereon;
   (B.2) disposing a second portion of the mixture obtained in (A) on the substrate comprising the first portion of the mixture obtained in (B.1), the disposing preferably being from the inlet end toward the outlet end of the substrate; and preferably drying the substrate comprising the first and the second portion of the mixture disposed thereon.

54. The process of any one of embodiments 47 to 53, wherein calcining according to (C) is performed in a gas atmosphere having a temperature in the range of from 300 to 800° C., preferably in the range of from 350 to 700° C., the gas atmosphere preferably being air.

55. The process of any one of embodiments 47 to 54, calcining according to (C) is performed in a gas atmosphere for a duration in the range of from 0.2 to 4 hours, preferably in the range of from 0.5 to 3 hours, the gas atmosphere preferably being air.

56. A selective catalytic reduction catalyst for the treatment of an exhaust gas of a combustion engine, preferably a selective catalytic reduction catalyst for the treatment of an exhaust gas of a combustion engine according to any one of embodiments 36 to 46, obtainable or obtained by a process according to any one of embodiments 47 to 55.

57. A method for the selective catalytic reduction of nitrogen oxide, the method comprising
   (I) providing the exhaust gas stream, preferably from a combustion engine, preferably a diesel engine;
   (II) passing the exhaust gas stream provided in (I) through a selective catalytic reduction catalyst according to any one of embodiments 36 to 46 and 56.

In the context of the present invention, the term "based on the weight of the zeolitic material" refers to the weight of the zeolitic material alone, meaning without copper and/or iron.

Further, in the context of the present invention, the term "the surface of the internal walls" is to be understood as the "naked" or "bare" or "blank" surface of the walls, i.e. the surface of the walls in an untreated state which consists-apart from any unavoidable impurities with which the surface may be contaminated—of the material of the walls.

In the context of the present invention, the expression "a coating disposed on the substrate (i)" encompasses that said coating can be disposed within the internal walls of the substrate (i) and/or on the surface of the internal walls of the substrate (i).

Further, in the context of the present invention, the term "combustion engine" preferably relates to a diesel engine.

Further, in the context of the present invention, the term "alumina sol" can be used interchangeably with "colloidal alumina".

In the context of the present invention, the particles of a given zeolitic material are formed by agglomerate(s) or aggregate(s) of the crystals of said zeolitic material. In other words, agglomerate(s) or aggregate(s) of the crystals of a given zeolitic material form the particles of said zeolitic material.

In the context of the present invention, the term "outer surface" of a given zeolitic material refers to the outer surface of the crystals (or particles) of said zeolitic material.

Furthermore, in the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

Furthermore, in the context of the present invention, the term "consists of" with regard to the weight-% of one or more components indicates the weight-% amount of said component(s) based on 100 weight-% of the entity in question. For example, the wording "wherein from 0 to 0.00001 weight-% of the composition consists of X" indicates that among the 100 weight-% of the components of which said composition consists of, 0 to 0.00001 weight-% is X. The present invention is further illustrated by the following Reference Examples, Comparative Examples, and Examples.

EXAMPLES

Reference Example 1 Measurement of the BET Specific Surface Area

The BET specific surface area was determined according to DIN 66131 or DIN-ISO 9277 using liquid nitrogen.

Reference Example 2 Measurement of the Average Porosity and the Average Pore Size of the Porous Wall-Flow Substrate The average porosity of the porous wall-flow substrate was determined by mercury intrusion using mercury porosimetry according to DIN 66133 and ISO 15901-1.

Reference Example 3 Determination of the Volume-Based Particle Size Distributions The particle size distributions were determined by a static light scattering method using Sympatec HELOS (3200) & QUIXEL equipment, wherein the optical concentration of the sample was in the range of from 6 to 10%.

Reference Example 4 Determination of the Average Thickness of a Layer Comprising a Non-Zeolitic Oxidic Material in a Composition To determine the thickness of a given layer on the outer surface of a zeoltic material in a composition, said composition was first coated on a substrate, such as the one used in Example 1 or 2, dried at 130° C. for 30 minutes and calcined at 450° C. for 2 hours. Further, at least ten TEM (Transmission Electron Microscopy) images of the coated substrate were generated. The thickness of said given layer was measured on said at least ten TEM images by applying a scale at several parts of the images and averaging over all measurement points at all crystals/particles, examples are given in FIG. 8. FIG. 8.1 or 8.2 shows how the layer thickness was determined on one TEM image.

Reference Example 5 Determination of the Average Crystal Size of a Zeolitic Material The average crystal size of a zeolitic material was determined by analyzing the zeolitic material powder with TEM images. The size of individual crystals was determined by averaging the crystal size from 20 to 30 individual crystals from at least two TEM images done with a magnification in the range of from 5 000 to 12 000.

Comparative Example 1: Process for Preparing a Selective Catalytic Reduction Catalyst Comprising a Zeolitic Material Comprising Copper not According to the Present Invention Slurry 1:

A CuO powder having a Dv50 of 33 micrometers was added to water. The amount of CuO was calculated such that the total amount of copper, calculated as CuO, in the coating after calcination was 4.15 weight-% based on the weight of the Chabazite. The resulting mixture was milled using a continuous milling apparatus so that the Dv50 value of the particles was about 2 micrometers and the Dv90 value of the particles was about 5 micrometers. The resulting slurry had a solid content of 8 weight-% based on the weight of said slurry. Acetic acid and an aqueous zirconium acetate solution was added to the CuO-containing mixture forming a slurry. The amount of acetic acid was calculated to be 1.7 weight-% of the Chabazite and the amount of zirconium acetate was calculated such that the amount of zirconia in the coating, calculated as $ZrO_2$, was 5 weight-% based on the weight of the Chabazite. Separately, a Chabazite (Dv50 of 2.2 micrometers, a Dv90 of 5.2 micrometers, a $SiO2:Al_2O_3$ of 18, an average crystal size of 0.4 micrometer) was added to water to form a mixture having a solid content of 36 weight-% based on the weight of said mixture. The Cu-Chabazite mixture was mixed to the copper containing slurry. The amount of the Cu-Chabazite was calculated such that the loading of Chabazite after calcination was 84% of the loading of the coating in the catalyst after calcination. The resulting slurry was milled using a continuous milling apparatus so that the Dv90 value of the particles was of about 5 micrometers.

Slurry 2:

Separately, an aqueous slurry having a solid content of 12 weight-% based on the weight of said slurry and comprising water and alumina ($Al_2O_3$ 95 weight-% with SiO2 5 weight-% having a BET specific surface area of about 180 $m^2/g$, a Dv90 of about 5 micrometers) was prepared. The amount of alumina+silica was calculated such that the amount of alumina+silica after calcination was 10 weight-% based on the weight of the Chabazite after calcination.

Subsequently, slurries 1 and 2 were combined, the solid content of the obtained final slurry was of about 31 weight-% based on the total weight of said final slurry. A porous uncoated wall-flow filter substrate, silicon carbide, (an average porosity of 60.5%, a mean pore size of 20 micrometers and 350 CPSI and 0.28 mm (11 mil) wall thickness, diameter: 1.5 inch (38.1 mm)*length: 6 inches (152.4 mm)) was coated twice from the inlet end to the outlet end with the final slurry over 100% of the substrate axial length. To do so, the substrate was dipped in the final slurry from the inlet end until the slurry arrived at the top of the substrate. Further a pressure pulse was applied on the inlet end to distribute the slurry evenly in the substrate. Further, the coated substrate was dried at 130° C. for 30 minutes and calcined at 450° C. for 2 hours. This was repeated once. The final coating loading after calcinations was about 2 g/in³, including about 1.68 g/in³ of CHA zeolitic material, 0.17 g/in³ of alumina+silica, about 0.084 g/in³ of zirconia and 4.15 weight-% of Cu, calculated as CuO, based on the weight of the CHA zeolitic material.

Characterization:

Analysis of the TEM micrographs (FIG. 1) of the obtained coated substrate demonstrates that no alumina is found around the zeolitic material crystals. Instead, Si-doped-alumina is intermittently dispersed between/among the Chabazite crystals or particles (=agglomerates/aggregates of Chabazite crystals) or independently in separate sections of the sample (not shown on FIG. 1). Without wanted to be bound to any theory, it is believed that it is due to the particle size of the Si-doped-alumina which is significantly higher than that of the chabazite crystals.

Example 1: Process for Preparing a Selective Catalytic Reduction Catalyst Comprising a Zeolitic Material Comprising Copper In a first step, a zeolitic material having a framework type CHA (Dv50 of 2.2 micrometers, a Dv90 of 5.2 micrometers, a SiO2:Al₂O₃ of 18, an average crystal size of about 0.4 micrometer) was added to an aqueous solution of copper acetate (3.51 weight-% of Cu, calculated as CuO). The aqueous copper acetate solution is provided in a quantity sufficient to fill the pores of the CHA zeolitic material by incipient wetness impregnation to obtain a Cu content, calculated as CuO, of about 4.15 weight-%. After the impregnation, the Cu-containing zeolitic material was calcined in air for 2 hours at 500° C.

In a second step, an alumina sol (boehmite-colloidal dispersion: a solid content 22-25 weight-% and a Dv50 of the particles of alumina in the dispersion of about 90 nm) was dispersed in water and impregnated on the calcined Cu-zeolitic material so that the weight percent of the alumina amounts to 10 weight-% based on the weight of the zeolitic material after calcination. After the impregnation, the Cu-zeolitic material+alumina was calcined in air for 2 hours at 500° C. Subsequently, the calcined Cu-zeolite+alumina was dispersed in water and an aqueous zirconium acetate solution, forming a slurry. The amount of zirconium acetate was calculated such that the amount of zirconia in the coating, calculated as ZrO₂, was 5 weight-% based on the weight of the zeolitic material. Finally, acetic acid (1.7 weight-% based on the weight of the zeolitic material) was added to said slurry. The resulting slurry was milled using a continuous milling apparatus so that the Dv90 value of the particles was of about 4 micrometers and the solid content of the obtained slurry was adjusted to 31 weight-% based on the weight of said slurry.

The obtained slurry was coated twice on a porous uncoated wall-flow filter substrate, silicon carbide, (an average porosity of 60.5%, a mean pore size of 20 micrometers and 350 CPSI and 0.33 mm (13 mil) wall thickness, diameter: 1.5 inch (38.1 mm)*length: 6 inches (152.4 mm)) according to the process described in Comparative Example 1 in the foregoing. The final coating loading after calcinations was about 2.1 g/in³, including about 1.764 g/in³ of CHA zeolitic material, 0.176 g/in³ of alumina, about 0.088 g/in³ of zirconia and 4.15 weight-% of Cu, calculated as CuO, based on the weight of the CHA zeolitic material.

Characterization:

TEM analysis (FIG. 2.1) of the obtained coated substrate shows that about 50-60% of the crystals exhibit some level of alumina coating. While some zeolitic material crystals are without visible alumina layers, other zeolitic material crystals are partially encased in alumina, forming a shell of alumina around the zeolitic material, the core. Only few Chabazite crystals are fully encased by alumina. The average thickness of the alumina layer was about 31 nm determined as in Reference Example 4.

Example 2: Process for Preparing a Selective Catalytic Reduction Catalyst Comprising a Zeolitic Material Comprising Copper The catalyst of Example 2 was prepared as the catalyst of Example 1 except that the amount of alumina sol was increased such that the weight percent of the alumina amounts to 30 weight-% based on the weight of the zeolitic material after calcination. The final coating loading after calcinations was about 2.1 g/in³, including about 1.51 g/in³ of CHA zeolitic material, 0.45 g/in³ of alumina, about 0.076 g/in³ of zirconia and 4.15 weight-% of Cu, calculated as CuO, based on the weight of the CHA zeolitic material.

Characterization:

TEM analysis (FIG. 2.2) of the obtained coated substrate clearly demonstrates that a significant fraction of Chabazite crystals are covered by a coating of alumina. While some zeolitic material crystals have little or no coating of alumina (10-20% of said crystals); many zeolitic material crystals are fully encased with alumina, with evidence for alumina morphology on the surface and sides of the primary chabazite crystals. The average thickness of the alumina layer was about 43 nm determined as in Reference Example 4. Hence, it is clear that in the catalyst of Example 2 alumina is forming a shell around the CHA zeolitic material, the core. A recapitulative table is provided in the following.

TABLE 1

| | Zeolitic material | Ion-exchange method | Oxidic material | wt.-%* | Final washcoat loadings (g/in³) |
|---|---|---|---|---|---|
| Comp. Ex. 1 | Cu-CHA (SAR: 18) | ISIE[a] | silica-alumina | 10 | 2.0 |
| Ex. 1 | Cu-CHA (SAR: 18) | Impregnation Cu acetate | alumina sol (nano-dispersed alumina) | 10 | 2.1 |
| Ex. 2 | Cu-CHA (SAR: 18) | Impregnation Cu acetate | alumina sol (nano-dispersed alumina) | 30 | 2.1 |

[a]ISIE, In-situ ion-exchange of a zeolitic material which is not pre-exchanged.
*based on the weight of the zeolitic material.

SAR: silica to alumina molar ratio.

Example 3: Testing of the Catalysts of Comparative Example 1, Examples 1 and 2—NOx Conversion and Backpressure 3.1 NOx Conversion The catalysts were aged in an oven at 800° C. hydrothermally (20% $O_2$, 10% $H_2O$ in % $N_2$) for 16 hours prior testing. The NOx conversion of the catalysts at 20 ppm ammonia slip was measured on a laboratory reactor. The reactor was equipped with 3 Fourier-transform infrared spectroscopy apparatus (FTIRs) to measure reactant and product concentrations, the temperature was adjusted with preheaters and a heater around the sample holder. The gas flows were adjusted with several mass flow controllers that allow mixing of different reactant gases. The measurements were done at 200° C. (500 ppm NO, $NH_3/NO_x$=1.5, 10% $O_2$, 5% $CO_2$, 5% $H_2O$, 80 ppm $C_3H_6$ (C1 basis)), at a space velocity of 40 k/h and at 600° C. 500 ppm NO, $NH_3/NO_x$=2.0, 10% $O_2$, 5% $CO_2$, 5% $H_2O$, 80 ppm $C_3H_6$ (C1 basis)), at a space velocity of 40 k/h and 80 k/h. The results are displayed on FIGS. 3 and 4.

3.2 Backpressure

The cold flow backpressure data recorded at a volume flow of 27 m$^3$/h and 293 K was reported on FIG. 5 (Fresh catalysts).

FIGS. 1 to 3 show that the low temperature (200° C.) performance decreases by only about 2% (close to the experimental error) for Example 1 and 6% for Example 2 compared to Comparative Example 1 and the high temperature (600° C.) performance however increases by 8% for Example 1 and 20% for Example 2 compared to the Comparative Example 1. Therefore, Example 3 demonstrates that there is a significant improvement in the high temperature performance while no significant loss in low temperature NOx activity. The catalysts of the present invention also present a reduction in backpressure of about 2.5% (Example 1) and of almost 15% (Example 2). Indeed, the catalyst of Example 2 exhibits a strong advantage in back pressure and high temperature performance, without a significant loss in low temperature $NO_x$ activity. Thus, without wanted to be bound to any particular theory, it is believed that the use of nanodispersed alumina in place of silica-alumina in a selective catalytic reduction catalyst comprising a zeolitic material permits to improve the catalytic performance and stability of the zeolitic material based catalyst and that increasing the amount of nano-dispersed alumina permits to reduce the backpressure and increase the NOx performance at high temperatures after ageing. Furthermore, without wanted to be bound to any particular theory, it is believed that the formation of a coating of alumina which encapsulates the CHA zeolitic material permits to reduce backpressure and increase the NOx performance at high temperatures after hydrothermal aging as it enhances its thermal durability. It is believed that the alumina around the zeolitic material may react with CuO and $AlO_x$ that are formed in an engine or during oven aging.

Comparative Example 2: Process for Preparing a Selective Catalytic Reduction Catalyst Comprising a Zeolitic Material Comprising Copper not According to the Present Invention The catalyst of Comparative Example 2 is prepared as the catalyst of Comparative Example 1 except that a different wall-flow filter was used, namely a porous uncoated wall-flow filter substrate, silicon carbide, (an average porosity of 60.5%, a mean pore size of 20 micrometers and 350 CPSI and 0.33 mm (13 mil) wall thickness, diameter: 2.28 inch (58 mm)*length: 5.9 inches (150.5 mm)) and that the final washcoat loading was of about 1.8 g/in$^3$, including 1.512 g/in$^3$ of CHA zeolitic material, 0.15 g/in$^3$ of alumina+silica, 0.0756 g/in$^3$ of zirconia and 4.15 weight-% of Cu, calculated as CuO, based on the weight of the CHA zeolitic material.

Comparative Example 3: Process for Preparing a Selective Catalytic Reduction Catalyst Comprising a Zeolitic Material Comprising Copper not According to the Present Invention The catalyst of Comparative Example 3 is prepared as the catalyst of Comparative Example 2 except that the amount of silica-alumina was increased to 20 weight-% based on the weight of the Chabazite after calcination. The final washcoat loading was of about 1.8 g/in$^3$, including 1.394 g/in$^3$ of CHA zeolitic material, 0.279 g/in$^3$ of alumina+silica, 0.07 g/in$^3$ of zirconia and 4.15 weight-% of Cu, calculated as CuO, based on the weight of the CHA zeolitic material.

Example 4: Process for Preparing a Selective Catalytic Reduction Catalyst Comprising a Zeolitic Material Comprising Copper The catalyst of Example 4 was prepared as the catalyst of Example 1 except that the amount of alumina sol was increased such that the weight percent of the alumina amounts to 20 weight-% based on the weight of the zeolitic material after calcination, that the amount of the CHA zeolitic material was reduced to 77.4 weight-% based on the final coating loading and that a different wall-flow filter was used, namely a porous uncoated wall-flow filter substrate, silicon carbide, (an average porosity of 60.5%, a mean pore size of 20 micrometers and 350 CPSI and 0.33 mm (13 mil) wall thickness, diameter: 2.28 inch (58 mm)*length: 5.9 inches (150.5 mm)). The final coating loading after calcinations was about 1.8 g/in$^3$, including about 1.394 g/in$^3$ of CHA zeolitic material, 0.279 g/in$^3$ of alumina, about 0.07 g/in$^3$ of zirconia and 4.15 weight-% of Cu, calculated as CuO, based on the weight of the CHA zeolitic material.

Example 5: Testing of the Catalysts of Comparative Examples 2 and 3 and Example 4—NOx Conversion and Backpressure 5.1 NOx Conversion The catalysts were aged in an oven at 800° C. hydrothermally (20% $O_2$, 10% $H_2O$ in % $N_2$) for 16 hours prior testing. The NOx conversion of the catalysts was measured on 2 L, 140 KW, Euro 6 engine at two different temperatures, namely 220° C. and 660° C. At 220° C.: conversion at 20 ppm slip, a volume flow 33 m$^3$/h, 110 ppm NOx and a NSR ($NH_3$/NOx) of 1.5. At 660° C.: conversion at maximum ammonia slip, a volume flow 63 m$^3$/h, 335 ppm NOx and a NSR ($NH_3$/NOx) of 2. The results are displayed on FIG. 6.

5.2 Backpressure

The cold flow backpressure data recorded at a volume flow of 65 m$^3$/h and 293 K was reported in FIG. 7 (Fresh catalysts).

As may be taken from FIGS. 6 and 7, back pressure and $NO_x$ conversion are similar for the catalysts of Comparative Examples 2 and 3, where the increase in silica-alumina content from 10% to 20% does not lead to a strong change in the performance. However, the catalyst of Example 4 shows a strongly reduced back pressure and high temperature $NO_x$ performance is enhanced. These results demonstrate that the catalyst preparation process and the type of alumina used in Example 4 lead to advantages in both backpressure and catalytic performance. Without wanting to be bound by any theory, it is believed that the use of a composition according to the present invention (namely with a zeolitic material covered by a layer of alumina) for preparing a selective catalytic reduction catalyst as the one of Example 4 permits to lower back pressure. Secondly, the encapsulation of the zeolitic material crystals in an alumina layer (shell) seems to improve the durability towards thermal exposure, resulting in the improved high temperature $NO_x$ conversion after ageing compared to the designs where the zeolite particles are not encapsulated in an alumina layer (Comparative Examples 2 and 3).

BRIEF DESCRIPTION OF THE FIGURES

FIG. 2 2.1: TEM micrograph of the Cu-Chabazite+alumina used in Example 1. 2.2: TEM micrograph of the Cu-Chabazite+alumina in Example 2. The white arrows show the alumina layer on the outer surface of the zeolitic material.

FIG. 8 shows the measurements of the average thickness of a layer comprising a non-zeolitic oxidic material (10 wt. % of alumina based on the weight of the zeolitic material—FIGS. 8.1 and 30 wt. % of alumina based on the weight of the zeolitic material—FIG. 8.2).

CITED LITERATURE

Figure 1:
FIG. 1 TEM micrograph of the Cu-Chabazite+alumina-silica used in Comparative Example 1.
Figure 3:
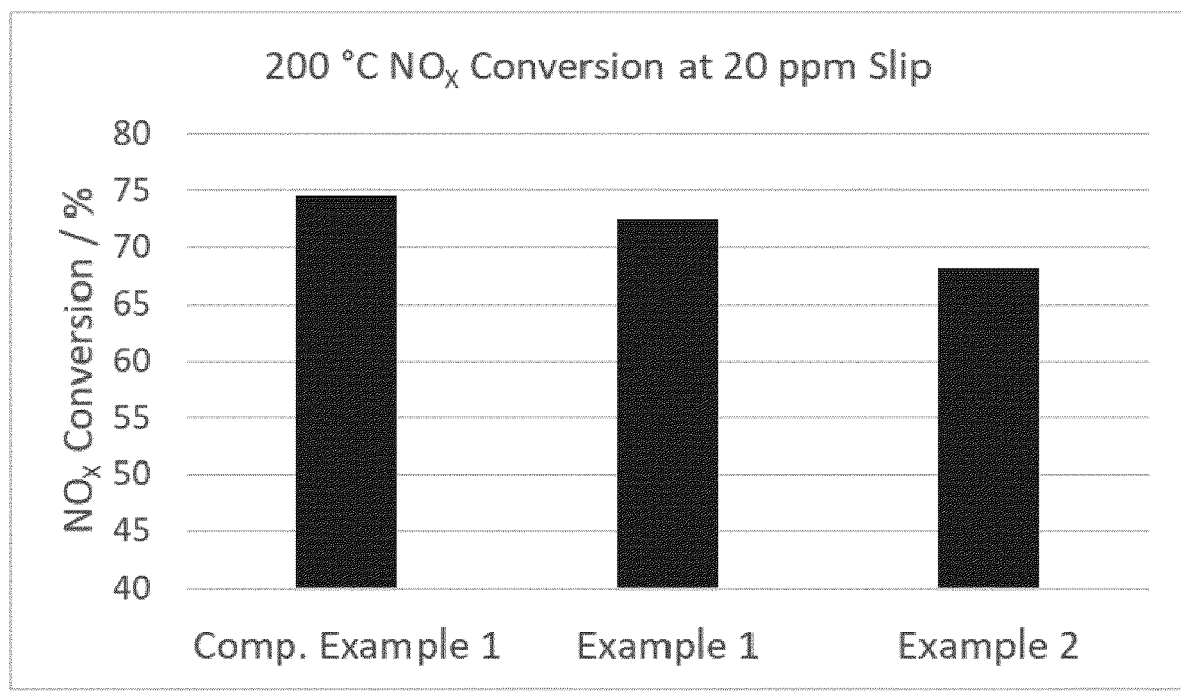
FIG. 3 shows the NOx conversion measured for the catalysts of Comparative Example 1 and of Examples 1 and 2 at 200° C. (SV: 40 k/h).
Figure 4:
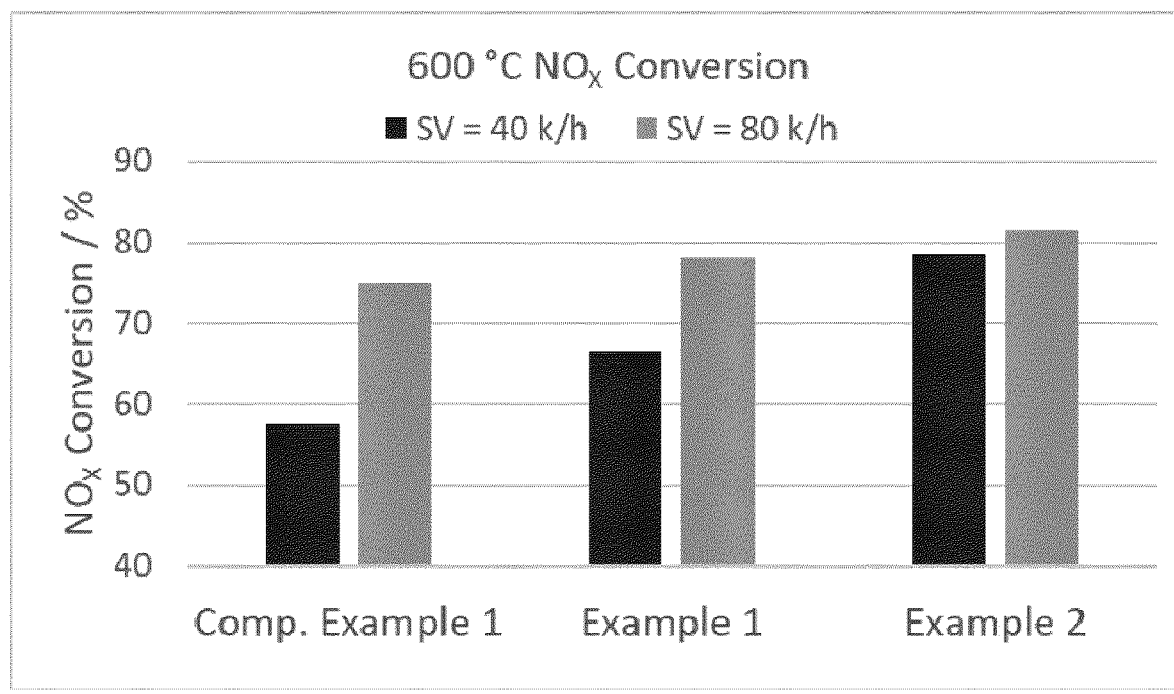
FIG. 4 shows the NOx conversion measured for the catalysts of Comparative Example 1 and of Examples 1 and 2 at 600° C. (SV: 40 and 80 k/h).
Figure 5:
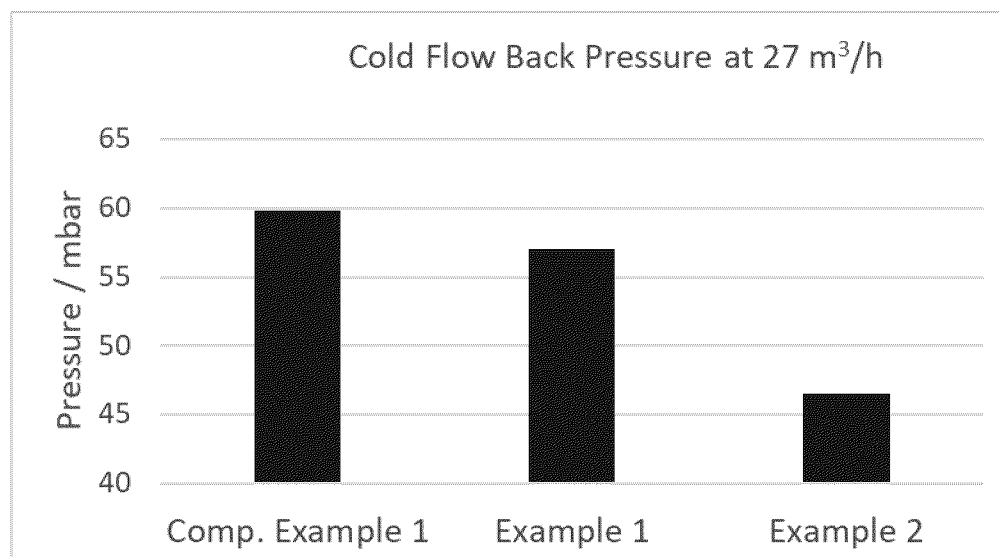
FIG. 5 shows the cold flow backpressure recorded for the catalysts of Comparative Example 1 and of Examples 1 and 2 at a volume flow of 27 m³/h.
Figure 6:
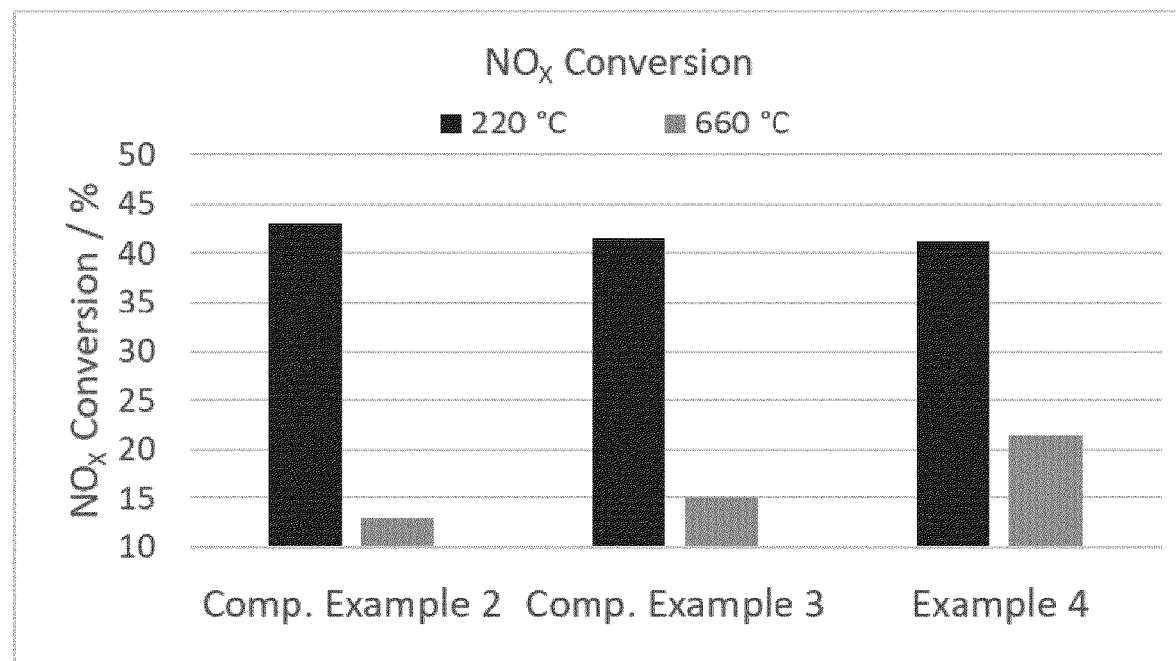
FIG. 6 shows the NOx conversion measured for the catalysts of Comparative Examples 2 and 3 and of Example 4 at 220° C. at 20 ppm $NH_3$ and at 660° C. at maximum $NH_3$ slip.
Figure 7:
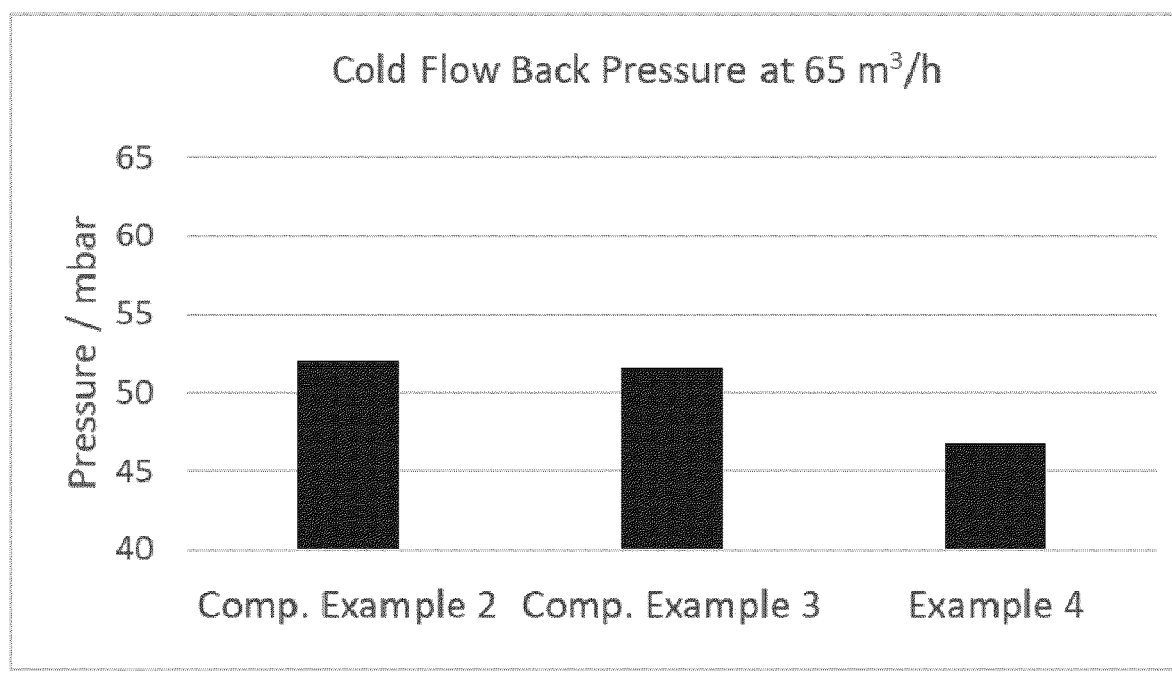
FIG. 7 shows the cold flow backpressure recorded for the catalysts of Comparative Examples 2 and 3 and of Example 4 at a volume flow of 65 m³/h.

US 2013/0101503 A1
US 2017/7050182 A1
CN 108993579 A
WO 2019/225909 A

The invention claimed is:
1. A composition comprising:
(i) a non-zeolitic oxidic material comprising alumina; and
(ii) an 8-membered ring pore zeolitic material comprising one or more of copper and iron, wherein a framework structure of the zeolitic material comprises a tetravalent element Y, a trivalent element X and oxygen, wherein the molar ratio of Y:X, calculated as $YO_2:X_2O_3$, ranges from 2:1 to 40:1;
wherein at least part of the outer surface of the zeolitic material according to (ii) is covered by a layer comprising the non-zeolitic oxidic material according to (i); and wherein Y comprises one or more of Si, Sn, Ti, Zr and Ge and X comprises one or more of Al, B, In and Ga;
wherein the composition is obtainable or obtained by a process, the process comprising:
(a) providing an 8-membered ring pore zeolitic material, comprising one or more of copper and iron, wherein the framework structure of the zeolitic material comprises a tetravalent element Y, a trivalent element X and oxygen, wherein the molar ratio of Y:X, calculated as YO2:X2O3, is in the range of from 2:1 to 40:1;
(b) providing a source of a non-zeolitic oxidic material comprising alumina, wherein the source of the non-zeolitic oxidic material is a colloid dispersion comprising particles of the non-zeolitic oxidic material, wherein the particles of the non-zeolitic oxidic material have a Dv50 in the range of from 30 to 200 nm;
(c) admixing the zeolitic material obtained in (a) with the source of the non-zeolitic oxidic material comprising alumina obtained in (b), forming a mixture;
(d) calcining the mixture obtained in (c) in a gas atmosphere having a temperature in the range of from 400 to 800° C.

2. The composition of claim 1, wherein from 98 weight-% to 100 weight of the non-zeolitic oxidic material according to (i) consist of alumina.

3. The composition of claim 1, wherein the layer comprising the non-zeolitic oxidic material according to (i) has an average thickness ranging from 2 nm to 100 nm.

4. The composition of claim 1, wherein from 99 weight-% to 100 weight-%, of the layer consist of the non-zeolitic oxidic material according to (i).

5. The composition of claim 1, wherein the 8-membered ring pore zeolitic material according to (ii) has a framework type selected from the group consisting of CHA, AEI, RTH, LEV, DDR, KFI, ERI, AFX, LTA, a mixture of two or more thereof and a mixed type of two or more thereof, preferably selected from the group consisting of CHA, AEI, RTH, a mixture of two or more thereof and a mixed type of two or more thereof, more preferably selected from the group consisting of CHA and AEI.

6. The composition of claim 1, wherein from 20% to 100%, of the outer surface of the zeolitic material according to (ii) are covered by the layer comprising the non-zeolitic oxidic material according to (i).

7. A slurry comprising a composition according to claim 1 and a dispersion agent, wherein the dispersion agent is one or more of water, ethanol, acetic acid, nitric acid, lactic acid, and a mixture of two or more thereof.

8. A selective catalytic reduction catalyst for treating an exhaust gas of a combustion engine, the catalyst comprising:
(1) a substrate comprising an inlet end, an outlet end, a substrate axial length extending from the inlet end to the outlet end and a plurality of passages defined by internal walls of the substrate extending therethrough;
(2) a coating disposed on the substrate (i), the coating comprising a composition according to claim 1.

9. The catalyst of claim 8, wherein the coating (2) further comprises an oxidic binder, wherein the oxidic binder comprises one or more of zirconia, alumina, titania, silica, and a mixed oxide comprising two or more of Zr, Al, Ti, and Si.

10. The catalyst of claim 8, wherein the coating (2) comprises the composition in an amount ranging from 80 weight-% to 100 weight-%, based on the weight of the coating (2).

11. The catalyst of claim 8, wherein the substrate is a wall-flow filter substrate, wherein the plurality of passages comprises inlet passages having an open inlet end and a closed outlet end, and outlet passages having a closed inlet end and an open outlet end.

12. A process for preparing the selective catalytic reduction catalyst for treating an exhaust gas of a combustion engine, the process comprising
   (A) preparing a mixture comprising water and a composition according to claim 1;
   (B) disposing the mixture obtained according to (A) on a substrate, the substrate comprising an inlet end, an outlet end, a substrate axial length extending from the inlet end to the outlet end and a plurality of passages defined by internal walls of the substrate extending therethrough, obtaining a mixture-treated substrate;
   (C) calcining the mixture-treated substrate obtained according to (B), obtaining the substrate having a coating disposed thereon.

13. A process for preparing a composition, the process comprising:
   (a) providing an 8-membered ring pore zeolitic material, comprising one or more of copper and iron, wherein a framework structure of the zeolitic material comprises a tetravalent element Y, a trivalent element X and oxygen, wherein the molar ratio of Y:X, calculated as $YO_2:X_2O_3$, ranges from 2:1 to 24:1, wherein the zeolitic material comprises crystals having an average crystal size in the range of from 0.05 micrometers to 5 micrometers;
   (b) providing a source of a non-zeolitic oxidic material comprising alumina, wherein the source of the non-zeolitic oxidic material is a colloid dispersion comprising particles of the non-zeolitic oxidic material, wherein the particles of the non-zeolitic oxidic material have a Dv50 ranging from 30 nm to 200 nm;
   (c) admixing the zeolitic material obtained in (a) with the source of the non-zeolitic oxidic material comprising alumina obtained in (b), forming a mixture; and
   (d) calcining the mixture obtained in (c) in a gas atmosphere having a temperature ranging from 400° C. to 800° C.

14. The process of claim 13, wherein the crystals of the 8-membered ring pore zeolitic material have an average crystal size ranging from 0.06 micrometers to 2 micrometers.

15. The process of claim 13, wherein the 8-membered ring pore zeolitic material comprises particles having a Dv50 ranging from 0.5 micrometers to 4 micrometers.

16. The process of claim 13, wherein the colloid dispersion comprising particles of the non-zeolitic oxidic material provided in (b) is alumina sol.

17. The process of claim 13, wherein the particles of the non-zeolitic oxidic material, the particles of alumina, have a Dv50 ranging from 50 nm to 150 nm.

* * * * *